June 2, 1942.    F. L. LE BUS    2,285,213
KNUCKLE JOINT
Filed July 30, 1941
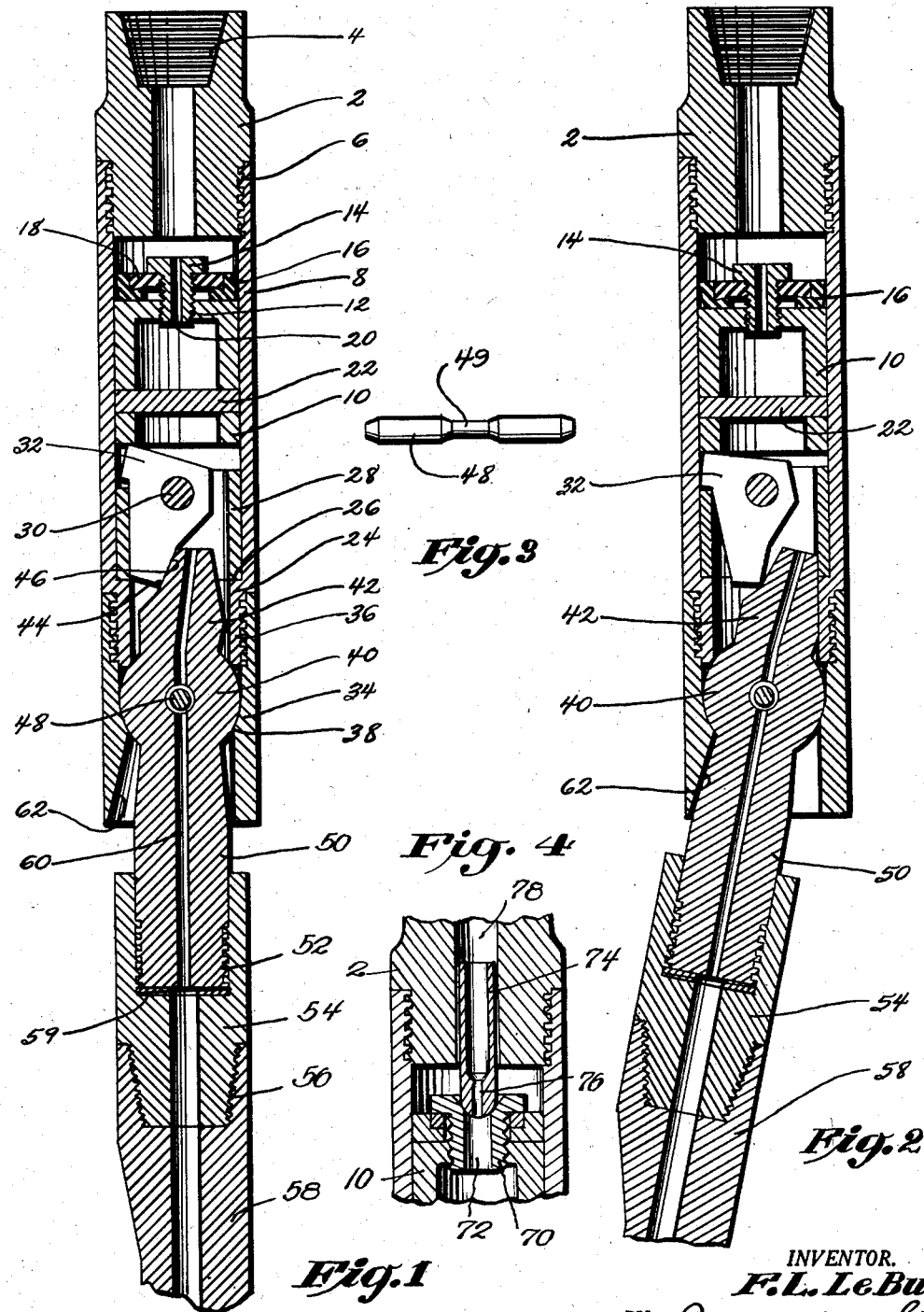
INVENTOR.
F. L. LeBus
BY E. M. McKnight
ATTORNEY Patented June 2, 1942

2,285,213

UNITED STATES PATENT OFFICE 2,285,213

KNUCKLE JOINT

Franklin L. Le Bus, Longview, Tex.

Application July 30, 1941, Serial No. 404,737

9 Claims. (Cl. 294—86)

This invention relates to improvements in fishing tools used in well drilling, and more particularly, but not by way of limitation to an improvement on Patent No. 2,103,988, granted to George F. Le Bus, December 28, 1937.

An important object of this invention is to provide a hydraulic knuckle joint for actuating a fishing tool or the like, so that the tool may be moved to an angular position when lowered to the proper level in the well hole.

And still another object of this invention is to provide fluid actuated pivotable means for use with fishing tools in wells in which the amount of fluid pressure can be varied in order to regulate the amount of torque or turning moment necessary to move the pivotable means.

And still another object of this invention is to provide a hydraulic knuckle joint providing pivotable means for motivating a fishing tool or the like by fluid pressure so constructed and arranged to break any sharp flow of circulating fluid and preclude washing out of the pivotable control means.

And still an additional object of this invention is to provide a hydraulic knuckle joint for moving fishing tools or the like into an angular position in enlarged bores of a well hole which is simple in construction and capable of easy assembly and disassembly for cleaning, repairs and the like.

Other objects and advantages of the invention will be evident from the following detailed description read in conjunction with the accompanying drawing which illustrates one form of my invention.

In the drawing:

Fig. 1 is a vertical sectional view of the knuckle joint showing it cooperating with a fragmentary fishing tool or the like.

Fig. 2 is a view similar to Fig. 1, but illustrating the knuckle joint moved to an oblique or angular position with pressure applied to the piston.

Fig. 3 is a detail view of the stud for anchoring the joint.

Fig. 4 is a modification showing the stud having an enlarged bore for preliminary wash downs of the well bore.

Referring to the drawing in detail, reference character 2 discloses an apertured collar or sub adapted to be connected by threads 4 to the lower end of a drill stem (not shown). It will be apparent that a set of jars (not shown) could be interposed in the drill stem at this point, since the knuckle joint is so constructed to withstand any normal jarring effect when needed. The collar 2 is threaded at 6 to a cylindrical member 8 forming an upper housing for the knuckle elements. Disposed within the housing 8 below the collar 2 is a freely movable cylindrical piston 10. The upper portion of the piston is formed with a threaded aperture 12 receiving an apertured stud 14 which secures the L-shaped annular rubber member 16 against the top of the piston 10 by means of a rubber retaining plate 18. The rubber member 16 prevents leakage of fluid in and around the piston 10. The stud 14 is provided with an aperture 20 which may be varied in size according to pump pressure available at the well surface as will be hereinafter explained.

The piston 10 carries a cross pin 22 utilized to break circulation of the fluid through the tool and prevent wash out of the pivot control lever below the piston 10. The inner periphery of the housing 8 is provided with a reduced diameter portion 24 forming shoulders 26 on which is disposed a cylindrical cage 28. A cross pin 30 is anchored in the cage 28 and in turn supports a freely movable cam lever 32 capable of swinging on the arc of a circle as will be hereinafter explained.

A lower housing 34 is threaded at 36 to the upper housing 8 and contains the knuckle joint proper. The inner periphery of the housing 34 is constructed with outwardly depending portions 38 forming a ball socket for receiving the ball 40. The ball 40 is provided with upper projecting portion 42 having a cam surface 44 cooperating with the cam surface 46 of the cam lever 32. In addition to supporting the ball 40 by the socket 38, a supporting pin or stud 48 extends through the knuckle joint 40 and is anchored in diametrically opposite apertures (not shown) provided in the housing 34. In this manner a double support is provided for the ball 40 and the pivot arm 42. An elongated projection 50 extends below the ball 40 and is provided at its lower ends with threads 52 for securing a connecting collar or sub 54, which in turn is provided at its lower end with threads 56 for receiving a fishing tool 58 (shown fragmentarily). A set of washers 59 may be interposed between the member 50 and collar 54 for adjusting the working side of the fishing tool so that it may be on the swinging side of the pivot arm, it being understood that these washers may be of irregular thicknesses to provide this adjustment. The knuckle joint member is provided with a duct 60 extending therethrough to allow for the passage of the circulating fluid. The pin 48 is provided with a reduced central portion 49 (see Fig. 3) to allow passage of fluid therearound and through the duct 60.

Operation

In operation the drill stem and fishing tool are lowered into the well to a point to contact the lost pipe and the drill stem is rotated slowly in order to ascertain if the lost pipe can be contacted without necessarily actuating the knuckle joint. In the event that the "fish" or lost pipe is in an enlarged bore of the well hole and cannot be contacted by normal disposition of the tool, circulation is then started from the mud pumps at the surface of a well (not shown) through the drill stem to where the mud and water strikes the top of piston 10, plate 18 and stud 14. The size of the aperture 20 in stud 14 regulates the flow of fluid through the piston and determines the amount of fluid pressure against the top of the piston, thereby determining the amount of torque for cam lever 32. The passage of the fluid from the pumps forces the piston 10 downward whereupon its lower surface contacts the upper face of cam lever 32 to cause it to pivot about the stud 30. Pivotal movement of the cam 32 cooperates with the knuckle member 42 through the complementary surfaces 44 and 46 (according to Figs. 1 and 2) of the ball 40 and its cooperating members 50, 54 and fishing tool 58. It will be noted that the inner periphery in the lowermost portion of housing 34 is cut away at 62 to allow free movement of the extension 50 to an oblique angular position.

Fig. 4 is a modification showing the arrangement of the upper portion of the piston where it is desired to wash down the well hole prior to actuating the knuckle joint and fishing tool. In this arrangement a modified stud 70 is utilized providing an enlarged bore 72 permitting free flow of fluid through the bore and into the well-hole for the preliminary wash down. The top of stud 70 is recessed to act as a valve seat for receiving the cylindrical valve 74. The lower portion of the valve 74 is provided with a restricted aperture 76, and after the preliminary wash down operation the valve is dropped through the operating string into contact with the stud 70 to provide circulation of the piston 10 as in the preferred embodiment, and allow for operation of the knuckle joint. The outside diameter of the valve 74 is of a diameter greater than the bore 72 upon which it seats, while the inside diameter is less than the bore 78 of the connecting sub 2 in order to admit fluid from the pumps (not shown) to the top of the piston 10. After operation of the knuckle joint the valve may be removed by means of a fishing spear on a wire line to provide for further wash downs if so desired.

From the foregoing it will be apparent that the invention provides a hydraulically actuated knuckle joint in which the fluid circulation is regulated to provide the proper amount of torque and facilitate the ease of the pivotal movement. Furthermore, the knuckle joint provides for the means in the actuating piston to interrupt or break any sharp flow of circulating fluid and prevent the possibility of the fluid washing out or destroying the pivotal means. Similarly, the arrangement and construction of the knuckle joint makes it capable of easy assembly and disassembly for repairs and the like, as well as allows for free flow of fluid circulation throughout the tool thereby keeping it clean, as well as provide circulation to the well hole and insure against cave-ins.

Changes may be made in the combination and arrangement of parts as heretofore set forth in the specification and shown in the drawing, it being understood that any modification in the precise embodiment of the invention may be made within the scope of the following claims without departing from the spirit of the invention.

What I claim is:

1. A knuckle joint for well fishing tools comprising a housing adapted to be secured to the lower end of a drill stem, a piston disposed in the housing adapted to be moved by fluid circulation, an apertured stud secured to the top of the piston to regulate the passage of fluid therethrough and determine the downward force of the piston, pivotal means responsive to the vertical downward movement of the piston for movement through an arc of a circle, and means disposed transversely of the piston adapted to retard fluid circulation and prevent washing out of the pivotal means.

2. A knuckle joint for well fishing tools comprising a housing adapted to be secured to the lower end of a drill stem, a piston disposed in the housing adapted to be moved by fluid circulation, apertured means secured to the top of the piston for regulating the passage of fluid therethrough and determine the downward force of the piston, pivotal cam means disposed in the housing below the piston, a ball pivotally disposed below the cam means and cooperating therewith, a fishing tool secured to the ball, said cam means being responsive to movement of the piston to pivot the ball and move the fishing tool to an oblique position relative to the axis of the well hole.

3. A knuckle joint for well fishing tools comprising a housing adapted to be secured to the lower end of a drill stem, a piston disposed in the housing adapted to be moved by fluid circulation, apertured means secured to the top of the piston for regulating the passage of fluid there through and determine the downward force of the piston, pivotal cam means disposed in the housing below the piston, a ball pivotally disposed below the cam means and cooperating therewith, a fishing tool secured to the ball, said cam means being responsive to movement of the piston to pivot the ball and move the fishing tool to an oblique position relative to the axis of the well hole, and a pin disposed transversely of the piston adapted to retard fluid circulation and prevent washing out of the cam means.

4. A knuckle joint for well fishing tools comprising a housing adapted to be secured to the lower end of a drill stem, a piston disposed in the housing and adapted to be moved downward by fluid circulation, pivotal cam means disposed in the housing below the piston, a ball pivotally disposed below the cam means and cooperating therewith, said ball having a projection extending downwardly therefrom, said cam means being responsive to movement of the piston to pivot the ball and move the projection to an oblique position relative to the axis of the well bore, and means arranged in the piston to retard circulation of the fluid and prevent washing out of the cam means.

5. A knuckle joint for well fishing tools comprising a housing adapted to be secured to the lower end of a drill stem, a piston disposed in the housing and adapted to be moved downward by fluid circulation, pivotal cam means disposed in the housing below the piston, a ball pivotally disposed below the cam means and cooperating therewith, said ball having a projection extending downwardly therefrom, said cam means being responsive to movement of the piston to pivot the ball and move the projection to an oblique position relative to the axis of the well bore, and means arranged in the top of the piston to regulate the flow of fluid and determine the amount of torque for the cam means.

6. A knuckle joint for well fishing tools comprising a housing adapted to be secured to the lower end of a drill stem, a piston disposed in the housing and adapted to be moved downward by fluid circulation, pivotal cam means disposed in the housing below the piston, a ball pivotally disposed below the cam means and cooperating therewith, said ball having a projection extending downwardly therefrom, said cam means being responsive to movement of the piston to pivot the ball and move the projection to an oblique position relative to the axis of the well bore, means arranged in the top of the piston to regulate the flow of fluid and determine the amount of torque for the cam means, and a cross pin arranged in the piston to break sharp circulation of the fluid and prevent washing out of the cam means.

7. A knuckle joint for well fishing tools comprising a housing adapted to be secured to the lower end of a drill stem, a piston disposed in the housing and adapted to be moved downward by fluid circulation, pivotal cam means disposed in the housing below the piston, a lower housing connected to the first mentioned housing and provided with a reduced diameter portion to form a socket, a ball disposed in the socket and adapted to pivot therein, a projection extending from the ball and having a cam surface adapted to contact the cam means, a second projection extending from the ball in a diametrically opposite direction and adapted to receive a fishing tool, said cam means being responsive to movement of the piston to pivot the ball and move the second projection and tool to an angled position relative to the axis of the well bore, and means for providing fluid circulation below the tool.

8. In a knuckle joint for well fishing tools comprising a housing adapted to be secured to the lower end of a drill stem, a piston disposed in the housing adapted to be moved by fluid circulation, an apertured stud secured to the top of the piston to allow circulation through the joint for washing down the well bore, a valve member cooperating with the stud to regulate the passage of fluid through the stud and determine the downward force on the piston, pivotal means responsive to the vertical downward movement of the piston for movement through an arc of a circle, and means pivotally disposed below the pivotal means and responsive to movement of the pivotal means to move the fishing tool to an oblique position relative to the axis of the well bore.

9. A knuckle joint for well fishing tools comprising a housing adapted to be secured to the lower end of a drill stem, a piston disposed in the housing adapted to be moved by fluid circulation, means cooperating with the piston to regulate the passage of fluid therethrough and determine the downward force of the piston, pivotal means responsive to vertical downward movement of the piston for movement through an arc of a circle, and means disposed transversally of the piston adapted to retard fluid circulation and prevent washing out of the pivotal means.

FRANKLIN L. LE BUS.